United States Patent [19]

Purdy

[11] 4,190,269

[45] Feb. 26, 1980

[54] ADAPTER FOR EXHAUST ACTUATED DEVICES

[75] Inventor: John W. Purdy, Vancouver, Canada

[73] Assignee: Wesgar Industries Ltd., Vancouver, Canada

[21] Appl. No.: 891,448

[22] Filed: Mar. 29, 1978

[51] Int. Cl.² .................................................. F16L 35/00
[52] U.S. Cl. ........................................ 285/38; 285/40; 285/98; 285/175; 285/177; 285/187; 285/280; 285/334.4; 285/390
[58] Field of Search ................ 285/38, 40, 390, 334.4, 285/8, 177, 280, 187, 175, 98

[56] References Cited

U.S. PATENT DOCUMENTS

| | | | |
|---|---|---|---|
| 76,030 | 3/1868 | Zinsser | 285/38 X |
| 327,737 | 10/1885 | Strong | 285/38 |
| 2,056,112 | 9/1936 | Protin | 285/390 X |
| 2,196,966 | 4/1940 | Hammer | 285/390 X |
| 2,467,922 | 4/1949 | Woytal et al. | 285/8 |
| 2,702,201 | 2/1955 | Romanelli et al. | 285/177 X |
| 3,052,257 | 9/1962 | Bartlett | 285/177 X |
| 3,248,133 | 4/1966 | Michnoff | 285/177 |

FOREIGN PATENT DOCUMENTS 1398926 4/1965 France ........................................ 285/40

Primary Examiner—Dave W. Arola
Attorney, Agent, or Firm—Fishburn, Gold & Litman

[57] ABSTRACT

An adapter for detachably interconnecting an exhaust stack with an exhaust actuated device comprises a hollow, frustoconically shaped body having first and second ends, and an inclined sidewall extending therebetween. The body first end is open for receiving exhaust gases from the stack therethrough, and the body second end communicates with the first end and is operably connected with the exhaust actuated device. The sidewall of the body includes advancing spiral threads on the exterior surface thereof which are shaped for engaging an interior, free edge of the stack, rotatably locking the adapter therein, thermally expanding and forming a secure and substantially airtight seal therebetween.

12 Claims, 4 Drawing Figures

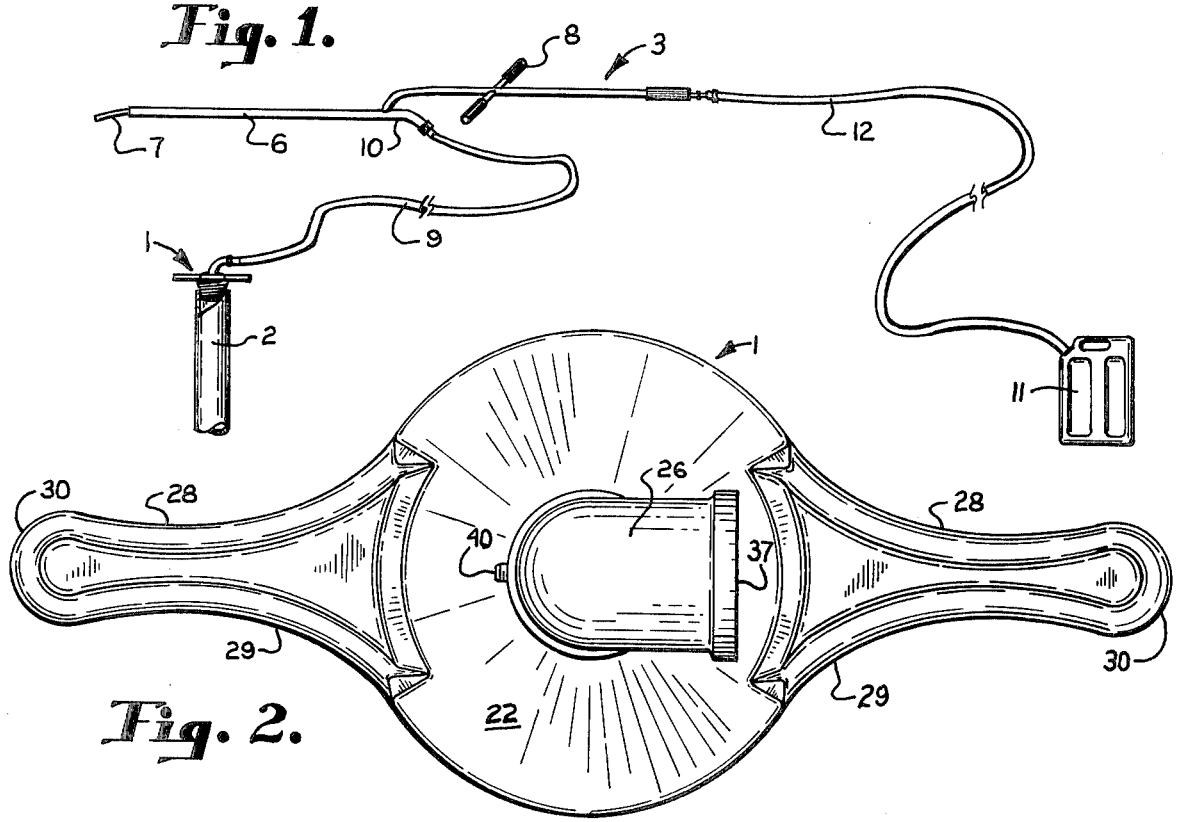
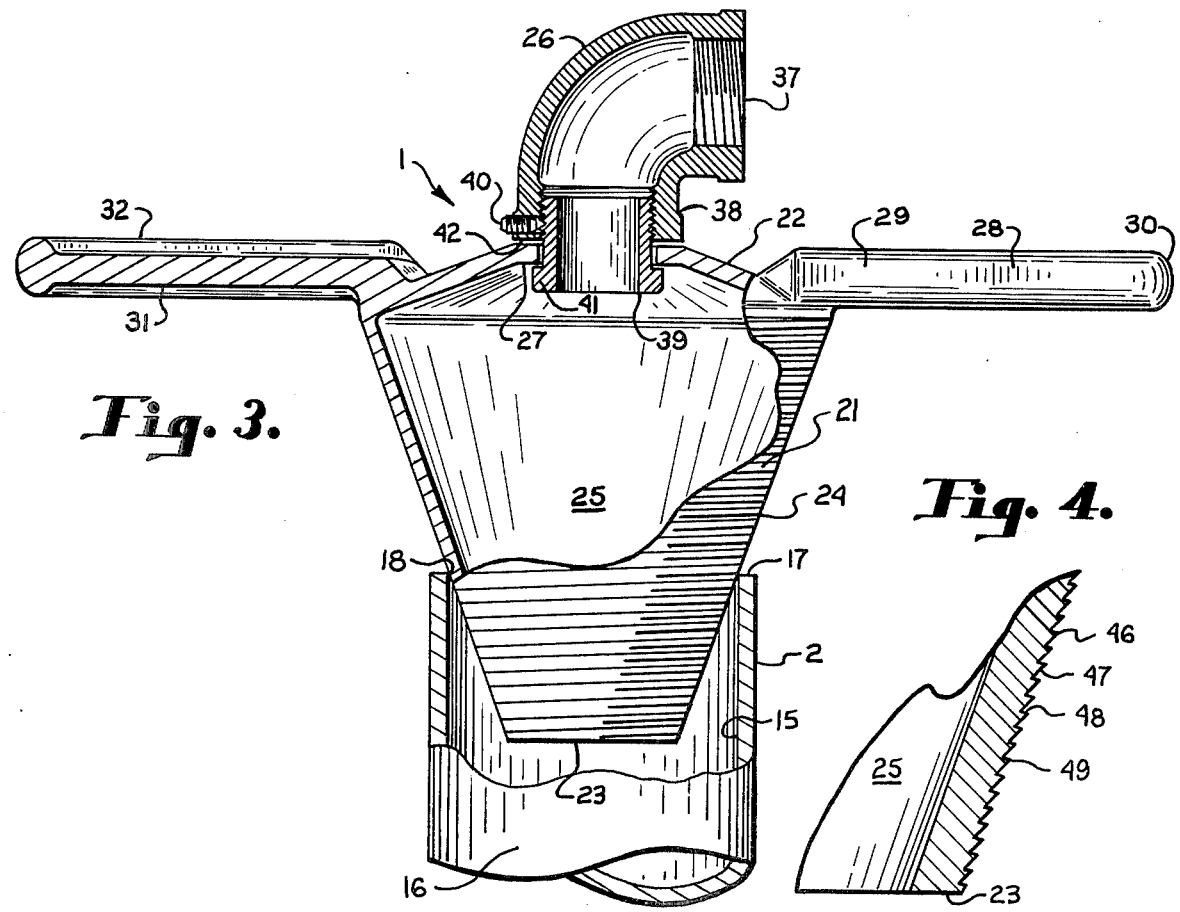

ADAPTER FOR EXHAUST ACTUATED DEVICES

BACKGROUND OF THE INVENTION

This invention relates to an adapter, and particular to frustroconically shaped adapters for exhaust actuated devices.

A variety of accessory devices such as sprayers, cleaning machines, defrosters, and the like, are operated from fluid pressure supplied by the exhaust gases of an engine, typically of the internal combustion type. These devices are generally designed for use in conjunction with a vehicle, such as an automobile, truck or tractor, and are adapted for connection with the engine mounted in the vehicle. The connection of the device with the engine is usually detachable, such that the accessory device may be removed from the engine when the vehicle is in a normal operating mode. When the adapter is in use, safe operation requires that the connection with the stack be sufficiently secure to resist the forces caused by the back pressure of the exhaust gases usually under conditions of substantial vibration and high heat. Yet, the adapter must be readily detachable from the stack for normal vehicle operation. Because the temperature and pressure of the exhaust gases is high, particularly when the idle speed of the engine has been inadvertently set at an excessive level, it is important that the interconnection of the adapter and stack be secure, so as to insure the safety of the operator.

SUMMARY OF THE INVENTION

The principal objects of the present invention are: to provide a frustroconical shaped adapter for detachably connecting an exhaust stack with an exhaust actuated device and forming a substantially airtight seal therebetween; to provide such an adapter having an exterior side wall with advancing spiral threads thereon for securely sealing the adapter with the stack; to provide such an adapter constructed of such a material and shape that the same thermally expands with respect to and within the stack for improved interconnection; to provide such an adapter wherein the threads provide quick and easy attachment to the stack and safe operation of the exhaust actuated device; to provide such an adapter having protruding handles for positioning and rotatably locking the adapter in the exhaust stack; to provide such an adapter having a rotatably mounted fitting for connecting a flexible hose member of the exhaust actuated device thereto for ease of use; to provide such a device wherein the threads are canted upwardly for secure sealing with the exhaust stack and safe operation; to provide such an adapter shaped for fitting a plurality of variously shaped stacks; and to provide such an adapter which is economical to manufacture, efficient in use, capable of a long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a schematic view of an adapter embodying the present invention, shown attached to and interconnecting an exhaust stack and an exhaust actuated device.

FIG. 2 is a top plan view of the adapter.

FIG. 3 is a side elevational view of the adapter having portions thereof broken away to show internal construction, and being shown connected with the exhaust stack.

FIG. 4 is an enlarged, fragmentary cross-sectional view of a threaded portion of the adapter.

DESCRIPTION OF THE PREFERRED EMBODIMENT

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "upper", "lower", "right", "left", "rear", "front", "vertical", "horizontal", and derivities thereof, shall relate to the invention as oriented in FIGS. 1 and 3, however, it is to be understood that the invention may assume various alternative orientations, except where expressly specified to the contrary.

The reference numeral 1 generally designates an adapter embodying the present invention for interconnecting an exhaust stack 2 with an exhaust actuated device, such as the illustrated spray cleaner 3.

The illustrated spray cleaner 3 is of a conventional design, such as that disclosed in U.S. Pat. No. 2,984,419, and comprises a wand 6 having a spray jet 7 disposed at the forwardly end thereof, and a handle portion 8 positioned on the rearward side of the wand. A flexible hose member 9 connects the exhaust stack 2 with the wand 6 and supplies pressurized exhaust gases thereto. In this example, the wand includes a venturi portion 10, whereby cleaning fluid may be drawn from a reservoir 11 through a flexible hose 12 and metered into the onrushing stream of exhaust gases and mixed therewith. It is to be understood that the illustrated spray cleaner 3 is but one example of a variety of exhaust actuated devices which are adapted for use in combination with the adapter 1.

The exhaust stack 2 is operably connected with an engine (not shown), preferably of the internal combustion type and mounted in a vehicle (not shown). The adapter 1 is particularly adapted for use in conjunction with vertically oriented exhaust pipes or stacks, such as those commonly provided on large trucks, tractors, off-the-road apparatus, agricultural equipment, and the like. The illustrated exhaust stack 2 has a cylindrical shape, and is normally, generally vertically oriented. The exhaust stack 2 includes inner and outer surfaces 15 and 16 respectively, and an upper, free end 17 with an interior edge 18. The free end 17 of the stack 2 is positioned in a substantially unobstructed area, whereby the adapter 1 may be rotated with respect to the stack 2 and innerconnected therewith.

The adapter 1 comprises a hollow, frustroconical shaped body 21 having upper and lower ends 22 and 23 respectively, and an inclined or tapered sidewall 24 extending therebetween. The lower end 23 of the body is open and permits exhaust gases from the stack 2 to enter into the central, interior cavity 25 of the adapter. The upper end 22 of the body 21 is slightly convex or domed, and includes a swivel fitting 26 rotatably mounted at a flattened center portion 27 thereof. A pair of handle members 28 are connected with and extend from opposing sides of the upper end 22 of the body 21 and are adapted for grasping by human hands. In the illustrated structure, the handle members 28 extend from the upper end 22 in a diametrically opposed fashion, and include arcuately shaped inner ends 29 which arcuately merge or blend with the outer periphery of the upper end, and rounded free ends 30. In this example, the handle members 28 include a central rib portion 31 and an enlarged marginally positioned flange 32 for increased strength and rigidity. Preferably, the handle members 28 are formed integrally with the body 21, by means such as casting. The illustrated body 21 is very sturdy and rigid, and is constructed of a durable, heat resistant material such as ductile iron. The adapter material preferably has a coefficient of thermal expansion which is slightly greater than that of the stack material, whereby during operation of the spray cleaner 3, the heat from the engine exhaust gases causes the adapter body to expand or swell radially outwardly with respect to and within the stack 2 thereby securely locking the adapter tightly in place. Increased temperatures simply tightens the seal between the adapter and the stack.

The swivel fitting 26 is adapted for detachably connecting the spray cleaner flexible hose 9 with the adapter 1. In the illustrated example, the swivel fitting 26 is L-shaped with a threaded free end 37 shaped for secure attachment with a mating fitting member on the associated end of the flexible hose 9. The lower end 38 of the swivel fitting is similarly threaded and is connected with a collar member 39 by a suitable fastener such as the illustrated set screw 40. The collar member 39 extends through a mating aperture disposed in the central portions 27 of the body upper end, and includes on the lower end thereof an outwardly extending flange 41 which, in conjunction with the lower edge 42 of the fitting 26, prevents axial movement of the swivel fitting, yet permits rotation of the same with respect to the body 21. The swivel fitting 26 allows the operator to freely manipulate the wand 6 without fear of kinking the flexible hose 9. During operation, the pressure within the body cavity 25 forces the fitting 26 upwardly, thereby assisting in the formation of a seal between fitting lower surface 42 and the associated upper surface of the flattened center portion 27.

The sidewall 24 of the body 21 is tapered and includes advancing spiral threads 46 which extend from the lower end 23 to the upper end 22 of the body 21. The illustrated sidewall 24 tapers inwardly from top to bottom in a funnel-like manner at an angle in the range of 15 to 20 degrees, and is adapted to fit exhaust stacks from approximately 1⅞ inches to 3⅝ inches in diameter. The threads 46 are preferably canted or raked toward the upper end 22 of the body for improved engagement with the interior edge 18 of the exhaust stack 2. In the illustrated example, the threads 46 include an outer surface 47 and an upper surface 48 which intersect at a sharp edge 49. The illustrated thread outer surface 47 is inclined upwardly at an angle in the nature of 45 degrees with respect to a reference plane disposed perpendicular to the central axis of the body, as well as generally to the lower surface 23 of the body. The illustrated upper surface 48 of the thread is disposed at an angle in the nature of 20 degrees from the aforementioned reference plane, which is approximately 65° from the thread outer surface 47. The illustrated adapter is provided with 14 threads per inch, and the threads are tempered to a very hard construction, whereby the same are durable and securely engaged the associated exhaust stack.

In operation, the adapter 1 is positioned into the exhaust stack 2 by the operator in a manner wherein the body lower end 23 of the adapter is disposed downwardly into the free end of the exhaust stack. Although the stack is typically hot due to engine use when the adapter is installed, the same may be connected with a cold stack in substantially the same manner. The user then aligns the adapter with the stack 2 in a manner whereby the central axis of each is substantially co-axially. The adapter 1 is then rotated by the operator in a clockwise fashion, as viewed from FIG. 2, and is thereby wedgingly locked in place with a partial turn, thereby forming a secure and substantially airtight seal between the adapter 1 and the exhaust 2. The engine (not shown) is then started, and exhaust gases are transferred through the stack 2 and flexible hose 9 into the cleaning wand 6. The exhaust gases from the engine heat the adapter, because of the thermal expansion between the adapter 1 and the stack 2, as well as the threads 46, the back pressure experience in the stack, as well as the vibration associated with engine operation will not cause inadvertent separation of the two members. When the operator has finished cleaning, the engine is shut off, and the exhaust stack 2 and adapter are preferably allowed to cool for a short time prior to disengagement of the same. After the adapter 1 has cooled to a point where the operator may handle the same with projective garmets, the operator grasps the handle members 28 and rotates the same with a substantially horizontal plane in a counterclockwise, fashion as viewed from FIG. 2, thereby releasing the wedging engagement between the adapter and exhaust stack and breaking the airtight seal thereinbetween. The adapter 1 is then separated from the exhaust stack and carried by the operator to a remote storage location. And the exhaust stack 2 is thereby opened allowing the engine to return to its normal operational mode.

It is to be understood that while I have illustrated and described certain parts of my invention, it is not to be limited to these specific forms or arrangement of parts therein described and shown.

What I claim and desire to secure by Letters Patent is:
1. An adapter for detachably interconnecting an exhaust stack with an exhaust actuated device, said adapter comprising:
   (a) a hollow, frustroconically shaped body having first and second ends, and an inclined side wall extending therebetween; said first end being open for receiving exhaust gases from the stack therethrough, and said second end communicating with said first end and having means for operably connecting said exhaust actuated device therewith; said body side wall including spiral threads on an exterior surface thereof which are adapted for engaging an interior, free edge of said stack, and rotatively locking said adapter therein; and wherein

(b) said adapter side wall is constructed of a material having a coefficient of thermal expansion which is greater than that of said stack, whereby during operation, said adapter expands with respect to and within said stack to form a secure and substantially airtight seal therebetween.

2. An adapter as set forth in claim 1 wherein:
(a) said threads are canted toward said body second end for secure engagement with said stack.

3. An adapter as set forth in claim 2 wherein:
(a) said threads include an outer surface and an upper surface; and
(b) said thread outer surface is inclined upwardly an angle of substantially 45 degrees with respect to a reference plane disposed perpendicularly to the central axis of said body.

4. An adapter as set forth in claim 3 wherein:
(a) said thread upper surface is disposed at an angle of substantially 65 degrees from said thread outer surface.

5. An adapter as set forth in claim 1 wherein:
(a) said means connecting said device to said adapter comprises a fitting rotatably connected with said body second end; and
(b) said fitting is L-shaped and includes a threaded free end adapted for connection with a flexible hose portion of said device.

6. An adapter as set forth in claim 5 wherein:
(a) said fitting includes a collar member which extends through a mating aperture in said body second end, and rotatably connects said fitting with said adapter body; and
(b) said collar includes a flange which is connected with a lower end of said collar and is disposed within said adapter body, whereby during operation, the exhaust gas pressure within said body urges said collar against an inside surface of the body second end to form a seal therebetween.

7. An adapter as set forth in claim 1 including:
(a) a handle member connected with and extending laterally from said body second end; said handle being adapted for grasping and rotatively locking the adapter in said stack.

8. An adapter as set forth in claim 7 wherein:
(a) said adapter is shaped for connection with an upper free end of a vertically oriented exhaust stack, whereby the weight of said adapter facilitates urging the same into sealing engagement with said stack.

9. An adapter as set forth in claim 1 wherein:
(a) said adapter is constructed of ductile iron.

10. In combination, an exhaust actuated device and an adapter for detachably interconnecting said device with an exhaust stack, said adapter comprising:
(a) a hollow, frustroconically shaped body having first and second ends, and an inclined side wall extending therebetween; said first end being open for receiving exhaust gases from the stack therethrough, and said second end communicating with said first end and being operatively connected with said exhaust actuated device; said body side wall including spiral threads on an exterior surface thereof which are adapted for engaging an interior, free edge of said stack, and rotatively locking said adapter therein; and wherein
(b) said adapter side wall is constructed of a material having a coefficient of thermal expansion which is greater than that of said stack, whereby during operation, said adapter expands with respect to and within said stack to form a secure and substantially airtight seal therebetween.

11. An adapter as set forth in claim 10 wherein:
(a) said threads are canted toward said body second end for secure engagement with said stack.

12. An adapter as set forth in claim 11 including:
(a) a pair of handle members connected with and extending from opposing sides of said body second end; said handle members being adapted for grasping to position and rotatively lock said adapter in said stack; and
(b) an L-shaped fitting having a first end thereof rotatably connected with said body second end, and a second end thereof detachably connected with a flexible hose portion of said device.

* * * * *